United States Patent
Chen et al.

(10) Patent No.: US 9,642,068 B2
(45) Date of Patent: May 2, 2017

(54) METHOD, NETWORK DEVICE, AND USER EQUIPMENT FOR CONTROLLING ACCESS TO CORE NETWORK

(71) Applicant: HUAWEI TECHNOLOGIES CO., LTD., Shenzhen, Guangdong (CN)

(72) Inventors: Yanyan Chen, Shenzhen (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 14/496,583

(22) Filed: Sep. 25, 2014

(65) Prior Publication Data

US 2015/0009887 A1    Jan. 8, 2015

Related U.S. Application Data

(63) Continuation of application No. PCT/CN2013/073288, filed on Mar. 27, 2013.

(30) Foreign Application Priority Data

Mar. 27, 2012 (CN) .......................... 2012 1 0084473
Jan. 14, 2013 (CN) .......................... 2013 1 0012933

(51) Int. Cl.
*H04W 48/10*      (2009.01)
*H04W 72/04*      (2009.01)
(Continued)

(52) U.S. Cl.
CPC ........... *H04W 48/10* (2013.01); *H04W 48/12* (2013.01); *H04W 72/042* (2013.01);
(Continued)

(58) Field of Classification Search
CPC ..... H04W 48/10; H04W 48/12; H04W 48/18; H04W 72/042; H04W 76/04; H04W 88/02
(Continued)

(56) References Cited

U.S. PATENT DOCUMENTS 7,072,651 B2    7/2006    Jiang et al.
7,577,432 B2    8/2009    Della-Torre
(Continued)

FOREIGN PATENT DOCUMENTS

CN      1518242 A      8/2004
CN    101925151 A    12/2010
(Continued)

OTHER PUBLICATIONS

International Search Report mailed Jul. 11, 2013, in corresponding International Patent Application No. PCT/CN2013/073288.
(Continued)

*Primary Examiner* — Afsar M Qureshi
(74) *Attorney, Agent, or Firm* — Staas & Halsey LLP

(57) ABSTRACT

The present invention discloses a method, a network device, and a user equipment for controlling access to a core network. The method includes: determining that a change occurs in access control information for controlling a user equipment to access a core network; and sending radio resource control signaling to the user equipment through a dedicated control channel, where the radio resource control signaling is used to notify the user equipment that a change occurs in the access control information, so that the user equipment updates the access control information. Therefore, a load of a core network node can be effectively controlled, and system performance is improved.

28 Claims, 10 Drawing Sheets

(51) Int. Cl.
*H04W 48/12* (2009.01)
*H04W 76/04* (2009.01)
*H04W 88/02* (2009.01)
*H04W 48/18* (2009.01)

(52) U.S. Cl.
CPC ............ *H04W 48/18* (2013.01); *H04W 76/04* (2013.01); *H04W 88/02* (2013.01)

(58) Field of Classification Search
USPC ........................................................ 370/312
See application file for complete search history.

(56) References Cited

U.S. PATENT DOCUMENTS

| | | | |
|---|---|---|---|
| 7,590,417 | B2 | 9/2009 | Jiang |
| 7,616,954 | B2 | 11/2009 | Jiang |
| 7,684,793 | B2 | 3/2010 | Jiang |
| 7,873,015 | B2 | 1/2011 | Gallagher et al. |
| 7,873,358 | B2 | 1/2011 | Jiang |
| 7,929,953 | B2 | 4/2011 | Jiang |
| 8,023,425 | B2 | 9/2011 | Raleigh |
| 2004/0152473 | A1 | 8/2004 | Kuwano et al. |
| 2005/0090262 | A1* | 4/2005 | Hamano ............ H04W 36/0011 455/445 |
| 2008/0144491 | A1* | 6/2008 | Yoshida .................. H04B 1/74 370/221 |
| 2010/0234026 | A1 | 9/2010 | Tenny et al. |
| 2011/0287800 | A1 | 11/2011 | Aoyagi et al. |
| 2012/0100834 | A1* | 4/2012 | Maeda .................. H04L 63/101 455/411 |
| 2013/0225190 | A1* | 8/2013 | Aoyagi ................. H04M 3/436 455/452.1 |
| 2014/0113633 | A1* | 4/2014 | Lee ....................... H04W 36/08 455/436 |
| 2014/0126527 | A1* | 5/2014 | Xiong ............... H04W 72/0413 370/329 |
| 2014/0206352 | A1* | 7/2014 | Mochizuki ............ H04W 60/04 455/435.1 |

FOREIGN PATENT DOCUMENTS

| | | |
|---|---|---|
| CN | 101945485 A | 1/2011 |
| CN | 102118828 A | 7/2011 |
| EP | 2451217 A1 | 5/2012 |
| EP | 2605488 A1 | 6/2013 |
| WO | 2009/045078 A2 | 4/2009 |
| WO | WO 2011/001526 A1 | 1/2011 |
| WO | 2012/020807 A1 | 2/2012 |

OTHER PUBLICATIONS

PCT International Search Report issued on Jul. 11, 2013 in corresponding International Patent Application No. PCT/CN2013/073288.
ITU-R Ad Hoc, "Proposed update of Section 5.1.2 toward Rev. 9 of M.1457", TSG-RAN Meeting #42, Athens, Greece, Dec. 2-5, 2008, 40 Pages.
"3rd Generation Partnership Project; Technical Specification Group Radio Access Network; UTRAN Iub interface Node B Application Part (NBAP) signalling (Release 11)", 3GPP TS 25.433 vol. 11.0.0, Dec. 2011, pp. 1-1285.
"3rd Generation Partnership Project; Technical Specification Group Radio Access Network; Radio Resource Control (RRC); Protocol specification (Release 11)", 3GPP TS 25.331, vol. 11.1.0, Mar. 2012, pp. 1-1911.
Chinese Office Action dated Apr. 14, 2016 in corresponding Chinese Patent Application No. 201310012933.8.
Chinese Search Report dated Mar. 23, 2016 in corresponding Chinese Patent Application No. 2013100129338.
Extended European Search Report dated Feb. 25, 2015 in corresponding European Patent Application No. 13767677.1.
"Access class barring enhancements to support PPAC and DSAC equivalent in LTE/SAE", NTT DoCoMo, 3GPP TSG-SA WG1 Meeting #39, Mexico, Jan.-Feb. 2008, 2 pp.
"DSAC and PPAC update upon SRNS relocation", Renesas Mobile Europe Ltd, 3GPP TSG-RAN WG2 Meeting #81, Republic of Malta, Jan.-Feb. 2012, 3 pp.

* cited by examiner

327

327

METHOD, NETWORK DEVICE, AND USER EQUIPMENT FOR CONTROLLING ACCESS TO CORE NETWORK

CROSS-REFERENCE TO RELATED APPLICATIONS

This application is a continuation of International Application No. PCT/CN2013/073288, filed on Mar. 27, 2013, which claims priorities to Chinese Patent Application No. 201210084473.5, filed on Mar. 27, 2012 and Chinese Patent Application No. 201310012933.8, filed on Jan. 14, 2013, all of which are hereby incorporated by reference in their entireties.

TECHNICAL FIELD

The present invention relates to the field of communications, and in particular, to a method, a network device, and a user equipment for controlling access to a core network.

BACKGROUND

In a current communication system, to avoid occurrence of a fault or congestion in a core network, a network operation and management (OAM) center node, after acquiring load information of the core network, generates access control information for controlling a user equipment to access the core network or a core network node, and configures the access control information for a serving radio access network node through an interface between the OAM and the serving radio access network node. After acquiring the access control information from the OAM, the serving radio access network node may send, by using a system broadcast message of a cell on a radio access network (RAN) side, an access control parameter to user equipments (UEs) of different access classes, to indicate whether access to the core network is permitted. The access control parameter may be domain specific access control (DSAC) information, and may also be paging permission access control (PPAC) information.

A principle of using DSAC information to control a user equipment accesses the core network is as follows: After receiving and stores the access control information acquired from the system broadcast message of the cell and when initiating a new service to a specific core network node, the UE determines an access control (AC) value stored in a subscriber identity module (SIM) card, and determines DSAC information corresponding to the AC value; and if a value of the DSAC information is Barred (Barred), the UE cannot attempt to access the core network; or if a value of the DSAC information is Not Barred (Not Barred), the UE can attempt to access the core network. In this way, load control is implemented for the core network node.

Similarly, a principle of using PPAC information to control the user equipment accesses the core network is as follows: After entering a cell, the UE receives PPAC information from a broadcast channel of the cell; after receiving a paging message and when the UE initiates a response message in response to the paging message, or initiates a location update (e.g. Location Update or Registration Update) message, or initiates a registration procedure to the network, the UE first determines a value of the PPAC information received from the broadcast channel of the cell; and if the value of the PPAC information is Not Barred, the UE may initiate the paging response message or the location update message or the registration message; or if the value of the PPAC information is barred, the UE needs to further determine whether the network wishes to bar access to a circuit switched (CS) domain or bar access to a packet switched (PS) domain.

In the current communication system, the DSAC/PPAC information is access control information based on a cell level, and can only be broadcast in a system broadcast message. Assuming that the UE has established a connection with a core network domain, for example, has established a connection with the CS domain, a cell change or handover occurs due to reasons of mobility and the like in a CS call process of the UE, and load information of a PS domain core network node, for example, a serving GPRS support node (SGSN, "GPRS" stands for general packet radio service), to which a new serving radio network controller (RNC) is connected is changed after the handover, or access control information in a new serving cell is changed due to a change of an SGSN. However, for a UE in a non cell dedicated channel (CELL_DCH) state, the UE cannot read a system broadcast message while transmitting and receiving data on a dedicated channel. As a result, the UE is unable to update the stored access control information according to the access control information of the new serving cell, and consequently, before the UE initiates a new PS call request, the UE cannot properly determine whether to initiate an access request to the core network.

SUMMARY

Multiple aspects of the present invention provide a method, a network device, and a user equipment for controlling access to a core network, so that the user equipment can update access control information in time and that the user equipment can properly determine whether to access a core network.

In one aspect of the present invention, a method for controlling access to a core network is provided, where the method includes: determining that a change occurs in access control information for controlling a user equipment to access a core network; and sending radio resource control (RRC) signaling to the user equipment through a dedicated control channel (DCCH), where the RRC signaling is used to notify the user equipment that a change occurs in the access control information, so that the user equipment updates the access control information.

In another aspect of the present invention, a method for controlling access to a core network is provided, where the method includes: receiving, from a system broadcast message of a cell, and storing access control information for controlling a user equipment to access a core network; determining that a change occurs in the access control information; and clearing the stored access control information.

In still another aspect of the present invention, a network device is provided, where the network device includes: a determining module, configured to determine that a change occurs in access control information for controlling a user equipment to access a core network; and a sending module, configured to send radio resource control (RRC) signaling to the user equipment through a dedicated control channel (DCCH), where the RRC signaling is used to notify the user equipment that a change occurs in the access control information, so that the user equipment updates the access control information.

In still another aspect of the present invention, a user equipment is provided, where the user equipment includes: a receiving module, configured to receive, from a system broadcast message of a cell, and store access control information for controlling the user equipment to access a core network; a determining module, configured to determine that a change occurs in the access control information; and a clearing module, configured to clear the stored access control information.

Based on the foregoing technical solutions, the user equipment can update the access control information in time, and further the user equipment can properly determine whether to access the core network. Therefore, accuracy of a system for controlling access to the core network more can be improved, and system performance is improved.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applicable to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), and a worldwide interoperability for microwave access (WiMAX) communication system.

It should also be understood that in the embodiments of the present invention, a user equipment (UE) may be referred to as a terminal, a mobile station (MS), a mobile terminal, and the like. The user equipment may communicate with one or multiple core networks through a radio access network (RAN). For example, the user equipment may be a mobile phone (or called as a "cellular" phone), a computer equipped with a mobile terminal, and the like. For example, the user equipment may also be a portable, pocket-sized, handheld, computer-embedded, or vehicle-mounted mobile apparatus, which exchanges voices and/or data with the radio access network.

In the embodiments of the present invention, a serving radio access network node may include a radio network controller (RNC), an NodeB, an evolved base station (eNB or eNodeB), or a base station controller (BSC), and the like; and a core network node to which the serving radio access network node is connected may include a serving GPRS support node (SGSN, where "GPRS" stands for general packet radio service), a mobility management entity (MME), a mobile switching center (MSC), or the like, which is not limited in the present invention. For ease of description, the following embodiments are described by using a serving radio access network node including an RNC as an example.

In addition, terms "system" and "network" can be used interchangeably in this document. A term "and/or" in this document merely describe an association relationship of associated objects, and represents that three relationships may exist, for example, A and/or B may represent the following three cases: A exists separately, both A and B exist, and B exists separately. In addition, a character "/" in this document usually represents that the former and later associated objects are in an "or" relationship.

Figure 1:
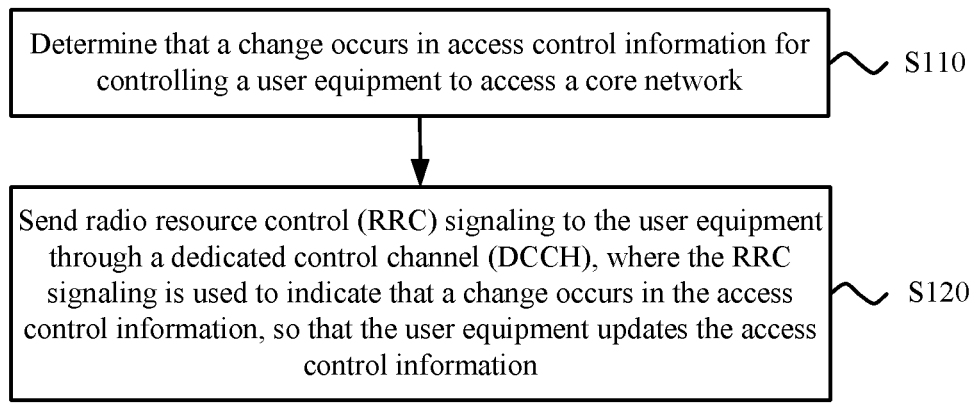
FIG. 1 is a schematic flowchart of a method for controlling access to a core network according to an embodiment of the present invention.

FIG. 1 shows a schematic flowchart of a method 100 for controlling access to a core network according to an embodiment of the present invention. The method 100 shown in FIG. 1 may be executed by a serving radio access network node of a user equipment, for example, may be executed by an RNC.

S110. Determine that a change occurs in access control information for controlling a user equipment to access a core network.

S120. Send radio resource control RRC signaling to the user equipment through a dedicated control channel DCCH, where the RRC signaling is used to notify the user equipment that a change occurs in the access control information, so that the user equipment updates the access control information.

In order that the user equipment can update access control information in time and can properly determine whether to access the core network, the RNC may determine, according to multiple factors such as load information and node information, that a change occurs in the access control information for controlling the user equipment to access the core network, and may send RRC signaling to the user equipment through a DCCH, so as to notify the user equipment that a change occurs in the access control information, so that the user equipment can update the access control information according to the RRC signaling.

Therefore, with the method for controlling access to a core network in the embodiment of the present invention, when a network device determines that a change occurs in access control information, the user equipment is notified through a dedicated control channel. Therefore, the user equipment can update the access control information in time, and further the user equipment can properly determine whether to access the core network. Therefore, a load of a core network node can be effectively controlled, and system performance is improved.

Therefore, in the embodiment of the present invention, the serving radio access network node can determine by itself according to some information in a handover process, that a change occurs in access control information, and can generate updated access control information for the user equipment, and a source for the serving radio access network node to determine whether a change occurs in the access control information is not merely a network operation and management center node.

It should be understood that the embodiment of the present invention is described by using only an RNC as an example. The embodiment of the present invention, however, is not limited thereto. The foregoing method 100 may also be executed by a serving radio access network node such as a base station, an evolved base station, or a base station controller (BSC).

It should also be understood that in the embodiment of the present invention, a UE in a non-CELL_DCH state or an idle state may not only know, by reading a system broadcast message of a cell, that a change occurs in access control information, and perform a corresponding update, but also know, by receiving RRC signaling sent by the RNC, that a change occurs in access control information. Therefore, the embodiment of the present invention may be not only applied to a UE in a CELL_DCH state, but also applied to a UE in another connected state. The embodiment of the present invention is described by using only a UE in a CELL_DCH state as an example, but the present invention is not limited thereto.

In S110, the serving radio access network node may determine, according to factors such as whether a change occurs in the serving radio access network node of the user equipment, whether a change occurs in a serving cell of the user equipment, whether a change occurs in a core network node to which the serving radio access network node of the user equipment is connected, whether a change occurs in access control information of the core network node to which the serving radio access network node of the user equipment is connected, a load condition of the core network node, and the like, whether a change occurs in the access control information for controlling the user equipment to access the core network.

In the embodiment of the present invention, optionally, it is determined, according to at least one of conditions that a change occurs in the serving radio access network node of the user equipment, a change occurs in the serving cell of the user equipment, a change occurs in the core network node to which the serving radio access network node of the user equipment is connected, a change occurs in the access control information of the core network node to which the serving radio access network node of the user equipment is connected, and a change occurs in the radio resource load of the serving cell of the user equipment, that a change occurs in the access control information for controlling the user equipment to access the core network.

In the embodiment of the present invention, optionally, the access control information includes at least one type of information in DSAC information, paging permission access control PPAC information, and registration access control information, but the embodiment of the present invention is not limited thereto. For example, the access control information may also be another access control information, such as domain specific access control information based on a service type.

The method 110 for determining that a change occurs in the access control information is hereinafter detailed with reference to FIG. 2A to FIG. 4.

Figure 2A:
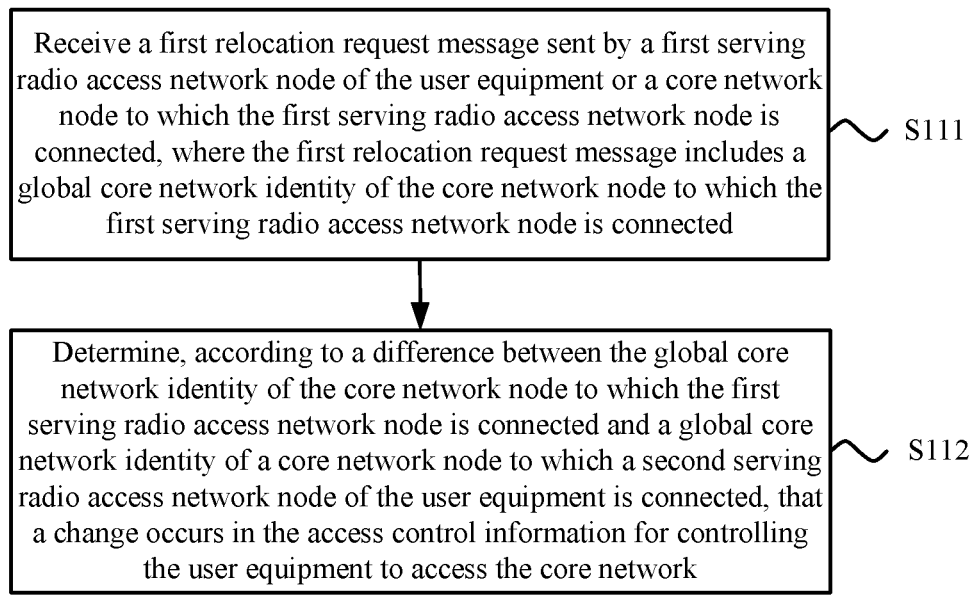
FIG. 2A and FIG. 2B are a schematic flowchart of a method for determining that a change occurs in access control information according to an embodiment of the present invention.

FIG. 2A shows a schematic flowchart of the method 110 for determining that a change occurs in access control information according to an embodiment of the present invention. The method 110 may be executed by a second serving radio access network node of the user equipment, for example, executed by an RNC.

S111. Receive a first relocation request (Relocation Required/Relocation Request) message sent by a first serving radio access network node of the user equipment or a core network node to which the first serving radio access network node is connected, where the first relocation request message includes a global core network identity of the core network node to which the first serving radio access network node is connected.

S112. Determine, according to a fact that the global core network identity of the core network node to which the first serving radio access network node is connected is different from a global core network identity of a core network node to which a second serving radio access network node of the user equipment is connected, that a change occurs in the access control information for controlling the user equipment to access the core network.

In the method 110 shown in FIG. 2A, the RNC may determine, according to a fact that the global core network identities (Global CN ID) of the core network nodes to which the first serving radio access network node is different from the second serving radio access network node are connected, that a change occurs in the core network node to which the serving radio access network node of the user equipment is connected, and further determine that a change may occur in the access control information.

It should be understood that in the embodiment of the present invention, the relocation request may also be referred to as a handover request (Handover Required or Handover Request) in an LTE network. The embodiment of the present invention is described by using a relocation request as an example, but the present invention is not limited thereto.

In the embodiment of the present invention, the first serving radio access network node refers to a radio access network node or a source radio access network node that provides services for the UE before a cell change or handover in a cell change or handover process of the user equipment; and the second serving radio access network node refers to a radio access network node or a target radio access network node that provides services for the UE after the cell change or handover in the cell change or handover process of the user equipment.

Optionally, the serving radio access network node includes a radio network controller RNC, a base station, or a base station controller BSC; and the core network node to which the serving radio access network node of the user equipment is connected includes a serving GPRS support node SGSN, a mobility management entity MME, or a mobile switching center MSC.

Figure 2B:
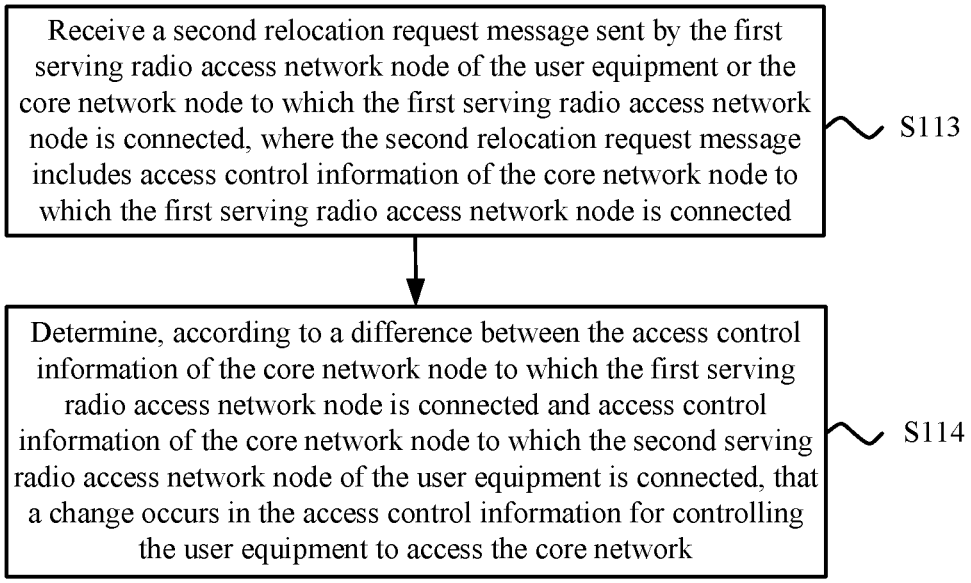

In the embodiment of the present invention, the RNC may determine, according to a fact that access control information included in the received relocation request message is different from current access control information of the core network node, that a change occurs in the access control information for controlling the user equipment to access the core network. Specifically, as shown in FIG. 2B, the method 110 may be executed by the second serving radio access network node of the user equipment, for example, executed by the RNC.

S113. Receive a second relocation request message sent by the first serving radio access network node of the user equipment or the core network node to which the first serving radio access network node is connected, where the second relocation request message includes access control information of the core network node to which the first serving radio access network node is connected.

S114. Determine, according to a fact that the access control information of the core network node to which the first serving radio access network node is connected is different from access control information of the core network node to which the second serving radio access network node of the user equipment is connected, that a change occurs in the access control information for controlling the user equipment to access the core network.

It should be understood that the second serving radio access network node of the user equipment may acquire, according to content of a current protocol, an identity, access control information, and the like of the second serving radio access network node that provides services for the UE after the cell change or handover. For brevity, details are not repeated herein.

Figure 3:
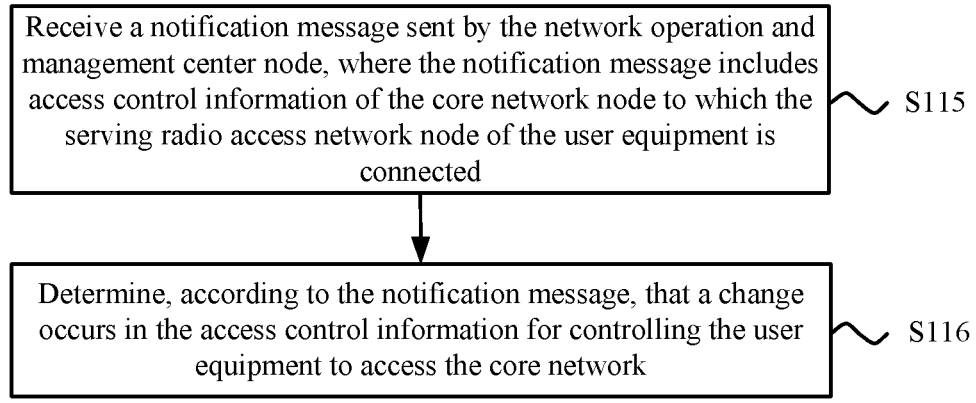
FIG. 3 is another schematic flowchart of a method for determining that a change occurs in access control information according to an embodiment of the present invention.

In the embodiment of the present invention, in a communication process between the user equipment and the network device, when no cell change or handover occurs, but a change occurs in access control information of the core network node, the network operation and management (Operation And Management) center node generally sends a notification message. Therefore, the serving radio access network node may also determine, according to the notification message, that a change occurs in the access control information for controlling the user equipment to access the core network. Specifically, the method 110 is shown in FIG. 3.

S115. Receive the notification message sent by the network operation and management center node, where the notification message includes access control information of the core network node to which the serving radio access network node of the user equipment is connected.

S116. Determine, according to the notification message, that a change occurs in the access control information for controlling the user equipment to access the core network.

In the embodiment of the present invention, in the communication process between the user equipment and the network device, the serving radio access network node may also determine, according to that a change occurs in the radio resource load condition of the serving cell of the UE, that a change occurs in the access control information for controlling the user equipment to access the core network. For example, when a radio resource load of the serving cell is changed from a light load (light load or normal load) state to a heavy load (heavy load) state, the access control information may be updated (for example, updated from not barred to barred) to restrict the user equipment from initiating a new service in the cell and consuming more radio resources; and when the radio resource load of the serving cell is changed from the heavy load state to the light load state, the access control information may be updated (for example, updated from barred to not barred) to allow the user equipment to initiate a new service in the cell and consume more radio resources.

Therefore, after the serving radio access network node determines that a change occurs in the access control information for controlling the user equipment to access the core network, the serving radio access network node sends RRC signaling to the user equipment through a DCCH, so as to notify the user equipment that a change occurs in the access control information, so that the user equipment can update the access control information in time and can properly determine whether to access the core network. Therefore, the load of the core network node can be effectively controlled, and system performance is improved.

In the foregoing embodiments, when determining that a change occurs in the access control information of the core network node to which the serving radio access network node of the user equipment is connected, the serving radio access network node actively sends signaling through a DCCH to notify the user equipment that a change may occur in the access control information. To reduce dedicated signaling delivered by the network device to the user equipment, the serving radio access network node may first not actively send updated access control information to the user equipment, or not actively notify the user equipment that a change may occur in the access control information. The serving radio access network node does not indicate that a change may occur in the access control information to the user equipment by using dedicated signaling, until a signaling connection request initiated by the user equipment to a core network device to be barred is received.

Figure 4:
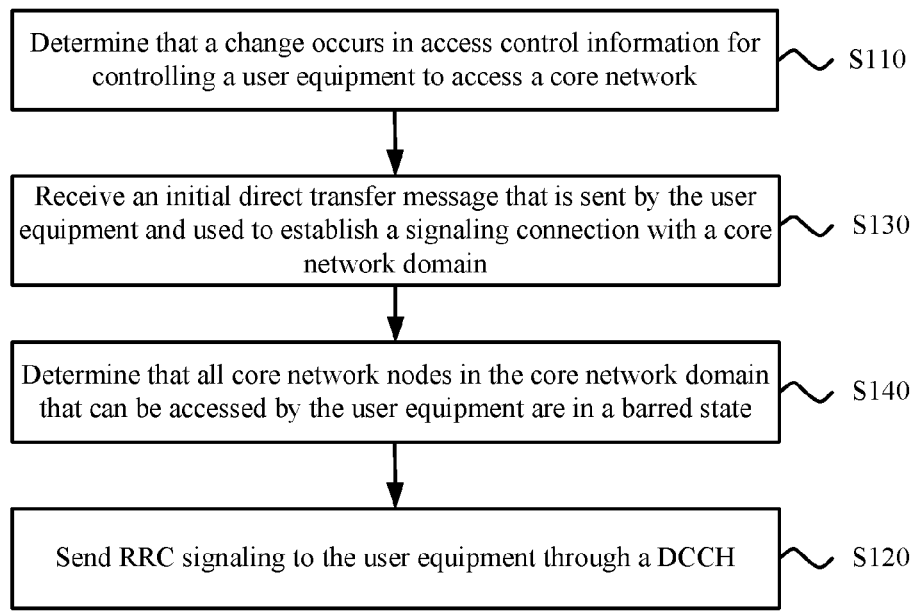
FIG. 4 is another schematic flowchart of a method for controlling access to a core network according to an embodiment of the present invention.

Specifically, as shown in FIG. 4, optionally, a method 100 for controlling access to a core network according to an embodiment of the present invention is described as follows:

S110. Determine that a change occurs in access control information for controlling a user equipment to access a core network.

S130. Receive an initial direct transfer message that is sent by the user equipment and used to establish a signaling connection with a core network domain.

S140. Determine that all core network nodes in the core network domain that can be accessed by the user equipment are in a barred state.

S120. Send radio resource control RRC signaling to the user equipment through a dedicated control channel DCCH, where the RRC signaling is used to notify the user equipment that a change occurs in the access control information, so that the user equipment updates the access control information.

Optionally, the core network domain includes a circuit switched domain or a packet switched domain.

For example, signaling and service connections exist between the user equipment and the CS domain, and PS domain access control information stored in the user equipment is "not barred or permitted". In a CS service call process, because a change occurs in core network access control information, PS domain access control information is changed from "not barred" to "barred or access forbidden". However, because the user equipment cannot read a system broadcast message, and either cannot acquire the updated PS domain access control information from the serving radio access network node, when the user equipment has a PS domain data packet to send, the user equipment initiates an initial direct transfer message to establish a service connection with the PS domain core network.

When the serving radio access network node of the user equipment receives a first signaling connection request destined for the PS domain, if the serving radio access network node detects and determines that a PS domain core network node of the user equipment is in an overloaded or "barred or access forbidden" state, the serving radio access network node may send the updated core network access control information to the user equipment by using RRC signaling. The RRC signaling may be any one of dedicated control messages mentioned in the foregoing embodiments, and may also be a signaling connection release (Signaling Connection Release) message or a packet assignment reject (Packet Assignment Reject message).

It should be understood that although the method 110 for determining that a change occurs in the access control information is detailed with reference to FIG. 2A to FIG. 4, the present invention is not limited thereto. The serving radio access network node may also determine, according to other information or parameters, that a change may occur in the access control information for controlling the user equipment to access the core network. For example, the serving radio access network node may determine, according to a load change condition of a core network node, a change condition of a serving cell of the user equipment, and the like, that a change occurs in the access control information. For another example, a target RNC may also determine that the target RNC is connected to an SGSN and/or an MSC different from an SGSN and/or an MSC to which a source RNC is connected, and therefore determine that a change occurs in the access control information; or a target RNC may also determine that an inter-MSC/SGSN handover occurs in a handover process, and therefore determine that a change may occur in the access control information.

In S120, the serving radio access network node may send the RRC signaling to the user equipment through the dedicated control channel DCCH, where the RRC signaling may include changed access control information, so as to notify the user equipment that a change occurs in the access control information. After receiving the RRC signaling, the user equipment may update the stored access control information. The RRC signaling may also carry other information, and only indicate that a change occurs in the access control information. In this case, after receiving the RRC signaling, the user equipment may clear the currently stored access control information, so that the user equipment can properly determine whether to access the core network. Therefore, the load of the core network node can be effectively controlled, and system performance is improved. Separate descriptions are given hereinafter with reference to FIG. 5.

Figure 5:
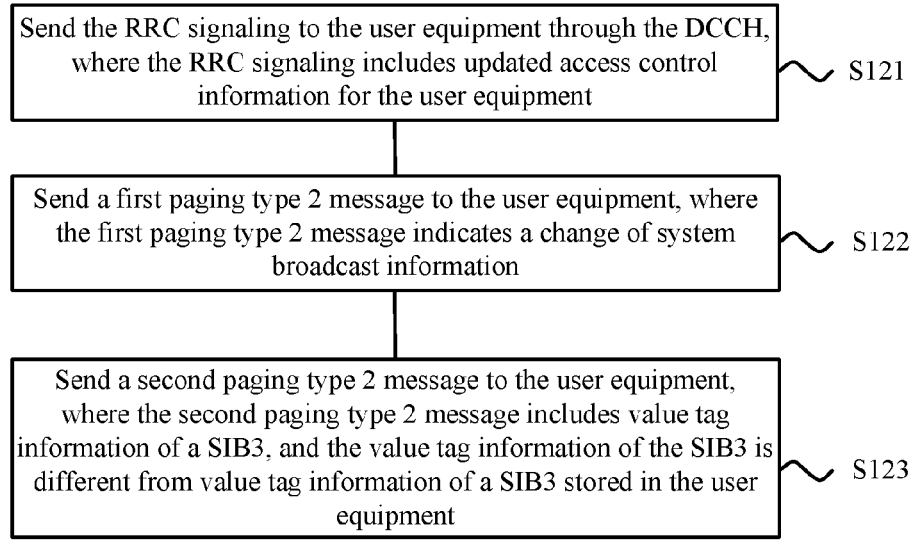
FIG. 5 is a schematic flowchart of a method for indicating that a change occurs in access control information to a user equipment according to an embodiment of the present invention.

In S121 shown in FIG. 5, optionally, the sending radio resource control RRC signaling to the user equipment through a dedicated control channel DCCH includes:

sending the RRC signaling to the user equipment through the DCCH, where the RRC signaling includes access control information used by the user equipment for update or an instruction for instructing the user equipment to clear the access control information.

For example, when the RNC determines that a change occurs in access control information of a core network node to which the current serving cell is connected, the RNC may construct a piece of RRC signaling, where the RRC signaling includes updated access control information, for example, may include DSAC information and/or PPAC information, and send the RRC signaling on a DCCH to, for example, the UE in the CELL_DCH state. After the UE receives the RRC signaling including the DSAC information and/or the PPAC information, the UE may clear the access control information currently stored in the UE, and store the updated access control information. Optionally, the DSAC information and/or the PPAC information may be at least one type of information in DSAC information, PPAC information, and registration access control information of a public land mobile network (PLMN) currently selected by the UE. For another example, the RRC signaling may include an instruction for instructing the user equipment to clear the access control information. After receiving the RRC signaling of the instruction, the UE may clear the access control information currently stored in the UE.

In the embodiment of the present invention, optionally, the sending the RRC signaling to the user equipment through the DCCH, where the RRC signaling is used to indicate updated access control information to the user equipment or used as an instruction for instructing the user equipment to clear the access control information, includes:

sending the RRC signaling to the user equipment through the DCCH, where all optional information elements in the RRC signaling are configured as null, and the RRC signaling is used to indicate the updated access control information to the user equipment or used as the instruction for instructing the user equipment to clear the access control information; or sending the RRC signaling to the user equipment through the DCCH, where an information element in the RRC signaling is configured as a pre-configured value, and the RRC signaling is used to indicate the updated access control information to the user equipment or used as the instruction for instructing the user equipment to clear the access control information.

Specifically, in the embodiment of the present invention, optionally, the sending the RRC signaling to the user equipment through the DCCH, where all optional information elements in the RRC signaling are configured as null, and the RRC signaling is used to indicate the updated access control information to the user equipment, includes:

sending the RRC signaling to the user equipment through the DCCH, where all optional information elements in the RRC signaling are configured as null, and the RRC signaling is used to instruct the user equipment to update the stored access control information from "access forbidden"/"access not forbidden" to "access not forbidden; or is used to instruct the user equipment to update the stored access control information from "access forbidden"/"access not forbidden" to "access forbidden".

For example, the RNC sends a piece of RRC signaling in a special format to the user equipment. When all optional information elements in the RRC signaling are set to null, the RRC signaling is used to instruct the user equipment to clear the stored access control information, or represents that the access control information stored in the user equipment is updated from "access forbidden (barred)"/"access not forbidden (not barred)" to "access not forbidden (not barred)", or represents that the access control information stored in the user equipment is updated from "access not forbidden (not barred)"/"access forbidden (barred)" to "access forbidden (barred)". By receiving the RRC signaling where all optional information elements are set to null, the user equipment may update, according to the conditions defined above, the access control information stored in the user equipment. For example, the RRC signaling in the special format may be a UTRAN mobility information message (UTRAN mobility Information). Therefore, according to this embodiment, a function of updating access control information variables stored in the user equipment can be implemented under control of a network device in a manner of not modifying a current RRC signaling format and an information element structure.

In the embodiment of the present invention, optionally, the sending the RRC signaling to the user equipment through the DCCH, where an information element in the RRC signaling is configured as a pre-configured value, and the RRC signaling is used to indicate the updated access control information to the user equipment or used as the instruction for instructing the user equipment to clear the access control information, includes:

sending the RRC signaling to the user equipment through the DCCH, where an information element in the RRC signaling is configured as a pre-configured value, and when the pre-configured value is a first value, the RRC signaling is used to instruct the user equipment to update the stored access control information from "access forbidden"/"access not forbidden" to "access not forbidden"; or when the pre-configured value is a second value, the RRC signaling is used to instruct the user equipment to update the stored access control information from "access forbidden"/"access not forbidden" to "access forbidden"; or when the pre-configured value is a third value, the RRC signaling is an instruction for instructing the user equipment to clear the access control information.

For example, the RNC sends a piece of RRC signaling in a special format to the user equipment. By setting an information element that has other meanings in the RRC message to a special reserved value, the RRC signaling may be used to represent that the access control information stored in the user equipment is cleared, or represent that the access control information stored in the user equipment is updated from "access forbidden (barred)"/"access not forbidden (not barred)" to "access not forbidden (not barred)", or represent that the access control information stored in the user equipment is updated from "access not forbidden (not barred)"/"access forbidden (barred)" to "access forbidden (barred)". By receiving the RRC message including the special reserved value, the user equipment may update, according to the condition of the reserved value defined above, the access control information stored in the user equipment. For example, the RRC signaling in the special format may be a UTRAN mobility information message (UTRAN mobility Information). Therefore, by using an information element in this message, some values may be reserved to represent an update of access control information. Herein, a C-RNTI is used as an example for description. It should be understood that other information elements, for example, other information elements in messages such as a U-RNTI, an H-RNTI, and an E-RNTI may also be used.

For example, when the pre-configured value is the first value, that is, C-RNTI=0000000000000000, it may represent that the access control information stored in the user equipment is updated from "access forbidden (barred)"/"access not forbidden (not barred)" to "access not forbidden (not barred)"; or when the pre-configured value is the second value, that is, C-RNTI=0000000000000001, it may represent that the access control information stored in the user equipment is updated from "access forbidden (barred)"/"access not forbidden (not barred)" to "access forbidden (barred)"; or when the pre-configured value is the third value, that is, C-RNTI=0000000000000002, it may represent that the access control information stored in the user equipment is cleared. Therefore, after the user equipment supporting this function receives a UTRAN mobility information RRC message, when a new C-RNTI in the message is equal to 0000000000000002, the access control information stored in the user equipment may be cleared; or when a new C-RNTI in the message is equal to 0000000000000001, the access control information stored in the user equipment may be updated to "access forbidden (barred)"; or when a new C-RNTI in the message is equal to 0000000000000000, the access control information stored in the user equipment may be updated to "access not forbidden (not barred)". According to this embodiment, a function of updating access control information variables stored in the user equipment can be implemented under control of a network device in a manner of not modifying a current RRC signaling format and an information element structure.

It should be understood that, when determining that the access control information is not changed, for example, when determining that the target RNC and source RNC are connected to the same SGSN and/or MSC in the handover process, or when determining that no inter-MSC/SGSN handover occurs in the handover process, or when determining that a change occurs in the radio resource load of the serving cell of the user equipment, the RNC may also send RRC signaling including latest access control information to the UE through the DCCH to simplify actions on a network side.

Optionally, the RRC signaling includes a universal mobile telecommunication system terrestrial radio access network (UTRAN) mobility information (UTRAN Mobility Information) message, a radio resource control reconfiguration message, a paging type 2 (Paging Type 2) message, a signaling connection release (Signaling Connection Release) message, or a packet domain assignment reject (Packet Assignment Reject) message. The radio resource control reconfiguration message may be, for example, a radio bearer (Radio Bearer) reconfiguration message, a transmission channel reconfiguration message, or a physical channel reconfiguration message.

Optionally, in S122 shown in FIG. 5, sending radio resource control RRC signaling to the user equipment through a dedicated control channel DCCH includes:

sending a first paging type 2 message to the user equipment, where the first paging type 2 message indicates that a change occurs in a system broadcast message.

For example, when the RNC determines that a change occurs in access control information of the core network node to which the current serving cell is connected, the RNC may send the first paging type 2 message to the UE, where the first paging type 2 message indicates that a change occurs in a system broadcast message. After receiving the first paging type 2 message, the UE may clear the currently stored access control information, for example, clear the currently stored DSAC information and/or PPAC information.

In S123 shown in FIG. 5, optionally, sending radio resource control RRC signaling to the user equipment through a dedicated control channel DCCH includes:

sending a second paging type 2 message to the user equipment, where the second paging type 2 message includes value tag information (Value Tag) of a system information block type 3 (SIB3), and the value tag information of the SIB3 is different from value tag information of a SIB3 stored in the user equipment.

For example, when the RNC determines that a change occurs in access control information of the core network node to which the current serving cell is connected, the RNC may send the second paging type 2 message to the UE, where the second paging type 2 message includes changed value tag information of a SIB3. After receiving the second paging type 2 message, the UE may compare the value tag information of the SIB3 included in the second paging type 2 message with the value tag information of the SIB3 stored in the UE, and if the two are different, the UE may clear the currently stored DSAC information and/or PPAC information, so that the user equipment can properly determine whether to access the core network.

Therefore, with the method for controlling access to a core network in the embodiment of the present invention, when the network device determines that a change occurs in access control information, the user equipment is notified through a dedicated control channel. Therefore, the user equipment can update the access control information in time, and further the user equipment can properly determine whether to access the core network. Therefore, the load of the core network node can be effectively controlled, and system performance is improved.

It should be understood that in the embodiment of the present invention, the serving radio access network node may also determine that a change occurs in mobility information of the user equipment, and send radio resource control RRC signaling to the user equipment through a dedicated control channel DCCH, where the RRC signaling is used to notify the user equipment that a change occurs in the core network access control information, so that the user equipment updates the access control information.

Optionally, determining that a change occurs in mobility information of the user equipment includes: determining that a change occurs in the access control information for controlling the user equipment to access the core network; or determining that one of the following parameters of the user equipment needs to be updated: integrity protection related information of the user equipment, encryption mode information of the user equipment, identity information of the user equipment, a timer and a variable used by the user equipment in the connected state, dedicated priority information of the user equipment, identity information of a UTRAN registration area (URA) to which the user equipment belongs, radio bearer (Radio Bearer) parameter information of the user equipment, and the like.

That is, when the serving radio access network node determines that the mobility information of the user equipment needs to be updated, the serving radio access network node may use dedicated signaling again to indicate core network access control information or information about whether access control information is changed, to the user equipment, but the embodiment of the present invention is not limited thereto.

Optionally, the RRC signaling includes the updated access control information for the user equipment or an instruction for instructing the user equipment to clear the access control information; and the RRC signaling includes a universal mobile telecommunication system terrestrial radio access network (UTRAN) mobility information message, a radio resource control reconfiguration message, a paging type 2 message, a signaling connection release message, or a packet domain assignment reject message. For brevity, details are not repeated herein.

The method for controlling access to a core network according to the embodiment of the present invention is detailed from a perspective of a network device with reference to FIG. 1 to FIG. 5. The method for controlling access to a core network according to an embodiment of the present invention is hereinafter described from a perspective of a user equipment with reference to FIG. 6 to FIG. 12.

Figure 6:
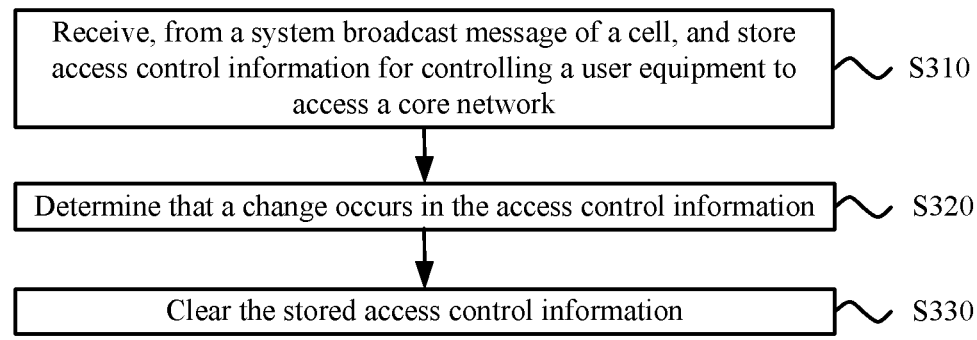
FIG. 6 is still another schematic flowchart of a method for controlling access to a core network according to an embodiment of the present invention.

As shown in FIG. 6, a method 300 for controlling access to a core network according to an embodiment of the present invention is described hereinafter. The method 300 may be executed by a user equipment, for example, may be executed by a UE.

S310. Receive, from a system broadcast message of a cell, and store access control information for controlling a user equipment to access a core network.

S320. Determine that a change occurs in the access control information.

S330. Clear the stored access control information.

Therefore, with the method for controlling access to a core network in the embodiment of the present invention, the user equipment determines that a change occurs in access control information, and updates the access control information in time, so that the user equipment can properly determine whether to access the core network. Therefore, a load of a core network node can be effectively controlled, and system performance is improved.

In S320, the user equipment may determine, according to an indication received from a serving radio access network node, that a change occurs in the access control information. That is, optionally, the determining that a change occurs in the access control information includes: determining, according to radio resource control RRC signaling sent by a serving radio access network node of the user equipment through a dedicated control channel DCCH, that a change occurs in the access control information, where the RRC signaling is used to notify the user equipment that a change occurs in the access control information. The user equipment may also determine, according to other parameters or information, that a change occurs in the access control information, without requiring any indication from the serving radio access network node. Separate descriptions are given hereinafter.

In the embodiment of the present invention, optionally, all optional information elements in the RRC signaling are configured as null, and the RRC signaling is used to indicate updated access control information to the user equipment or used as an instruction for instructing the user equipment to clear the access control information; or an information element in the RRC signaling is configured as a pre-configured value, and the RRC signaling is used to indicate updated access control information to the user equipment or used as an instruction for instructing the user equipment to clear the access control information.

Specifically, in the embodiment of the present invention, optionally, the clearing the stored access control information includes:

when all optional information elements in the RRC signaling are configured as null, updating the access control information stored in the user equipment from "access forbidden"/"access not forbidden" to "access not forbidden"; or when all optional information elements in the RRC signaling are configured as null, updating the access control information stored in the user equipment from "access forbidden"/"access not forbidden" to "access forbidden".

In the embodiment of the present invention, optionally, the clearing the stored access control information includes:

when the pre-configured value is a first value, updating the access control information stored in the user equipment from "access forbidden"/"access not forbidden" to "access not forbidden"; or when the pre-configured value is a second value, updating the access control information stored in the user equipment from "access forbidden"/"access not forbidden" to "access forbidden"; or when the pre-configured value is a third value, clearing the access control information stored in the user equipment.

Figure 7:
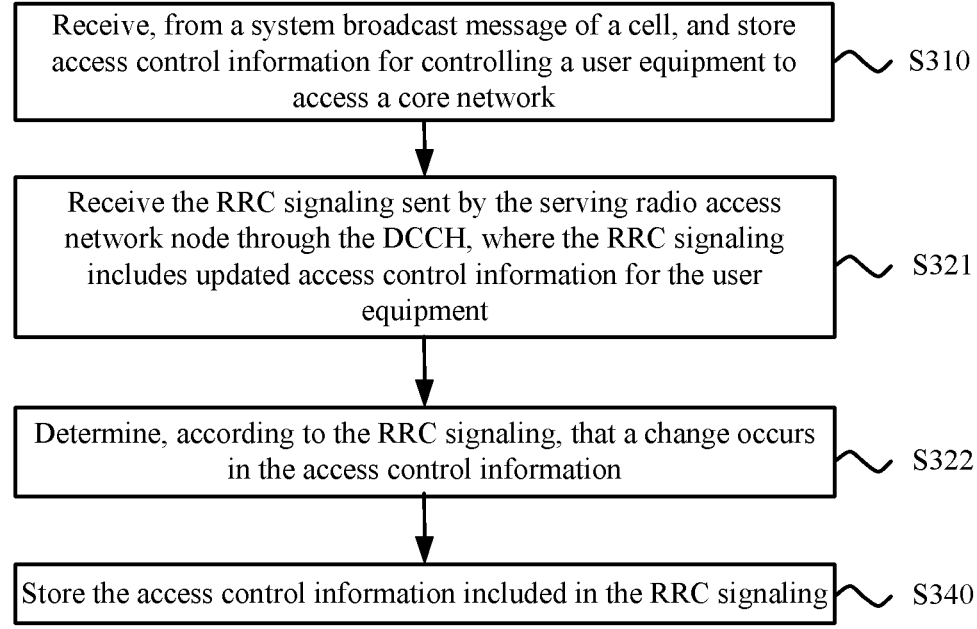
FIG. 7 is still another schematic flowchart of a method for controlling access to a core network according to an embodiment of the present invention.

FIG. 7 shows a schematic flowchart of a method 300 for controlling access to a core network according to an embodiment of the present invention. As shown in FIG. 7, the method 300 is described hereinafter, and the method 300 may be executed by a user equipment, for example, may be executed by a UE.

S321. Receive the RRC signaling sent by the serving radio access network node through the DCCH, where the RRC signaling includes updated access control information for the user equipment.

S322. Determine, according to the RRC signaling, that a change occurs in the access control information.

S330. Clear the stored access control information.

S340. Store the access control information included in the RRC signaling.

The clearing and storing in S330 and S340 may also be replacing the stored old access control information with new access control information, or updating the currently stored access control information by using specific access control information indications in the RRC signaling (for example, clearing the access control information, or updating the access control information from "access forbidden (barred)"/"access not forbidden (not barred)" to "access not forbidden (not barred)", or updating the access control information from "access forbidden (barred)"/"access not forbidden (not barred)" to "access forbidden (barred)").

In the embodiment of the present invention, optionally, the access control information includes at least one type of information in DSAC information, paging permission access control PPAC information, and registration access control information. Optionally, the access control information includes DSAC information and/or PPAC information of a public land mobile network (PLMN) currently selected by the UE.

Optionally, the RRC signaling includes a universal mobile telecommunication system terrestrial radio access network (UTRAN) mobility information (UTRAN Mobility Information) message, a radio resource control reconfiguration message, a paging type 2 (Paging Type 2) message, a signaling connection release message, or a packet domain assignment reject message. The radio resource control reconfiguration message may be, for example, a radio bearer (Radio Bearer) reconfiguration message, a transmission channel reconfiguration message, or a physical channel reconfiguration message.

In the method 300 shown in FIG. 7, the user equipment receives the RRC signaling that is sent by the serving radio access network node and includes the updated access control information. Therefore, according to the RRC signaling, the user equipment may not only know that a change occurs in the access control information, but also store, after clearing the currently stored access control information, the access control information included in the RRC signaling. Therefore, the user equipment can update the access control information in time. Therefore, a load of a core network node can be effectively controlled, and system performance is improved.

Figure 8:
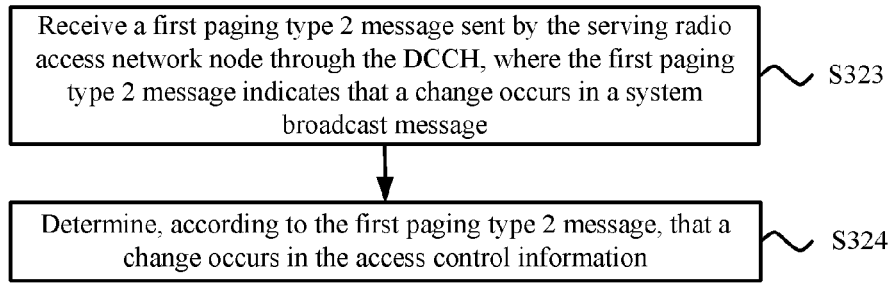
FIG. 8 is still another schematic flowchart of a method for determining that a change occurs in access control information according to an embodiment of the present invention.

In the embodiment of the present invention, the RRC signaling may also only indicate that a change occurs in the access control information. As shown in FIG. 8, a method 320 for determining that a change occurs in the access control information according to an embodiment of the present invention may be as follows:

S323. Receive a first paging type 2 message sent by the serving radio access network node through the DCCH, where the first paging type 2 message indicates that a change occurs in a system broadcast message.

S324. Determine, according to the first paging type 2 message, that a change occurs in the access control information.

That is, when receiving the first paging type 2 message indicating that a change occurs in a system broadcast message, the UE may determine that a change occurs in the access control information.

Figure 9:
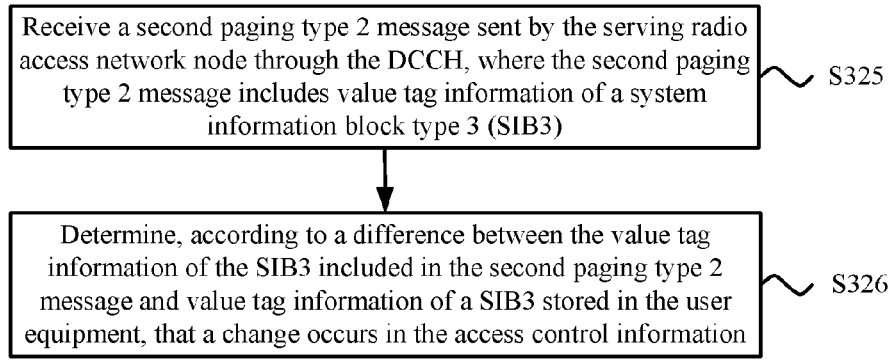
FIG. 9 is still another schematic flowchart of a method for determining that a change occurs in access control information according to an embodiment of the present invention.

As shown in FIG. 9, a method 320 for determining that a change occurs in the access control information according to an embodiment of the present invention may be as follows:

S325. Receive a second paging type 2 message sent by the serving radio access network node through the DCCH, where the second paging type 2 message includes value tag information of a system information block type 3 (SIB3).

S326. Determine, according to a fact that the value tag information of the SIB3 included in the second paging type 2 message is different from value tag information of a SIB3 stored in the user equipment, that a change occurs in the access control information.

That is, when the UE receives the second paging type 2 message including the value tag information of the SIB3, and determines that the value tag information of the SIB3 included in the second paging type 2 message is different from the value tag information of the SIB3 stored in the user equipment, the user equipment may determine that a change occurs in the access control information.

Therefore, with the method for controlling access to a core network in the embodiment of the present invention, the user equipment determines that a change occurs in access control information, and updates the access control information in time, so that the user equipment can properly determine whether to access the core network. Therefore, the load of the core network node can be effectively controlled, and system performance is improved.

In the embodiment of the present invention, the user equipment may also determine, according to parameters or information of the serving radio access network node, the core network node, and the like, that a change occurs in the access control information, without requiring the serving radio access network node to use any indication to notify that a change occurs in the access control information to the user equipment.

Figure 10:
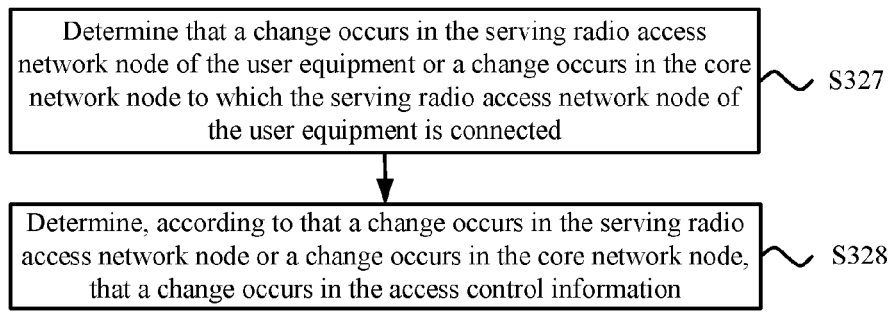
FIG. 10 is still another schematic flowchart of a method for determining that a change occurs in access control information according to an embodiment of the present invention.

Optionally, as shown in FIG. 10, a method 320 for determining that a change occurs in the access control information according to an embodiment of the present invention may be as follows:

S327. Determine that a change occurs in the serving radio access network node of the user equipment or a change occurs in the core network node to which the serving radio access network node of the user equipment is connected.

S328. Determine, according to that a change occurs in the serving radio access network node or a change occurs in the core network node, that a change occurs in the access control information.

Figure 11:
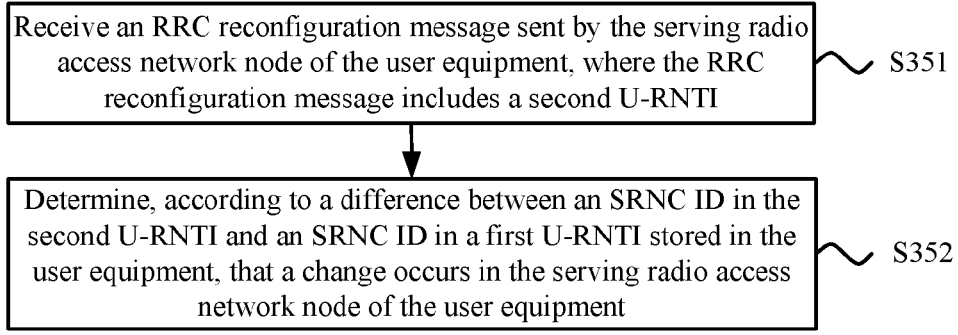
FIG. 11 is a schematic flowchart of a method for determining that a change occurs in a serving radio access network node according to an embodiment of the present invention.

Specifically, as shown in FIG. 11, a method 327 for determining that a change occurs in the serving radio access network node according to an embodiment of the present invention may be as follows.

S351. Receive an RRC connection reconfiguration message sent by the serving radio access network node of the user equipment, where the RRC reconfiguration message includes a second universal mobile telecommunication system terrestrial radio access network radio network temporary identifier (U-RNTI).

S352. Determine, according to a fact that a serving radio network controller identity (SRNC ID) in the second U-RNTI is different from an SRNC ID in a first U-RNTI stored in the user equipment, that a change occurs in the serving radio access network node of the user equipment.

It should be understood that the U-RNTI is an identity used to uniquely identify an air interface to which the user equipment is connected. The U-RNTI may be formed by two parts, that is, an S-RNTI and an SRNC ID. The S-RNTI is an identity assigned by the serving radio access network node to the user equipment and used to uniquely identify the user equipment within the service scope of the serving radio access network node. The SRNC ID is an identity of the serving radio access network node of the user equipment. In the embodiment of the present invention, the SRNC ID in the U-RNTI is used to determine whether a change occurs in the serving radio access network node of the user equipment.

For example, due to a reason of a coverage, load, or the like, a source RNC initiates a handover procedure to a UE in a CELL_DCH state, so that an RRC connection of the UE is handed over from the source RNC to a target RNC; when the UE receives a handover command constructed by the target RNC, namely, a reconfiguration message, the UE determines whether an SRNC ID in a U-RNTI included in the reconfiguration message is the same as an SRNC ID in a U-RNTI before the UE receives the handover command, and if the two SRNC IDs are different, the UE may determine that the serving RNC before the handover is different from that after the handover, that is, an inter-RNC handover (Inter-RNC Change) occurs, that is, the UE may determine that a change occurs in the serving radio access network node. Therefore, the UE may determine that a change occurs in the access control information, and the UE clears the currently stored PPAC information and/or DSAC information.

Figure 12:
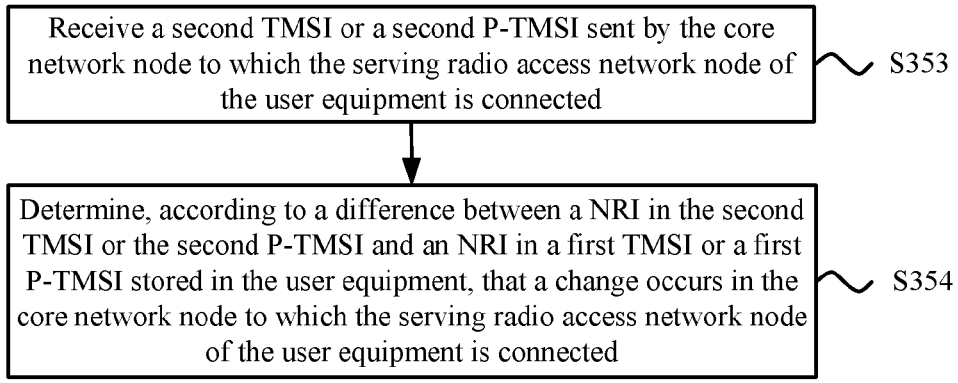
FIG. 12 is a schematic flowchart of a method for determining that a change occurs in a core network node to which a serving radio access network node is connected according to an embodiment of the present invention.

Specifically, as shown in FIG. 12, a method 327 for determining that a change occurs in the core network node to which the serving radio access network node is connected according to an embodiment of the present invention may be as follows:

S353. Receive a second temporary mobile subscriber identity (TMSI) or a second packet temporary mobile subscriber identity (P-TMSI) sent by the core network node to which the serving radio access network node of the user equipment is connected.

S354. Determine, according to a fact that a network resource identifier (NRI) in the second TMSI or the second P-TMSI is different from an NRI in a first TMSI or a first P-TMSI stored in the user equipment, that a change occurs in the core network node to which the serving radio access network node of the user equipment is connected.

For example, due to a reason of a coverage, load, or the like, a source RNC initiates a handover procedure to a UE in a CELL_DCH state, so that an RRC connection of the UE is handed over from the source RNC to a target RNC; after the handover, when the UE determines, according to an NRI field in a P-TMSI/TMSI assigned before and after the handover, that an inter-SGSN/MSC handover (Inter-SGSN/MSC Change) occurs, the UE may determine that a change occurs in the core network node to which the serving radio access network node of the user equipment is connected. Therefore, the UE may determine that a change occurs in the access control information, and the UE may clear the currently stored PPAC information and/or DSAC information.

In the embodiment of the present invention, optionally, the serving radio access network node includes a radio network controller RNC, a base station, or a base station controller BSC; and the core network node includes a serving GPRS support node SGSN, a mobility management entity MME, or a mobile switching center MSC.

It should be understood that interactions between the user equipment and the network device and related features and functions that are described on the user equipment side correspond to those described on the network device side. For brevity, details are not repeated herein.

It should also be understood that values of sequence numbers in the foregoing processes in each embodiment of the present invention do not mean an execution sequence; an execution sequence of each process should be determined by the function and internal logic of the process, and shall not be construed as a limitation on the implementation process of the embodiment of the present invention.

Therefore, with the method for controlling access to a core network in the embodiment of the present invention, the user equipment determines that a change occurs in access control information, and updates the access control information in time, so that the user equipment can properly determine whether to access the core network. Therefore, the load of the core network node can be effectively controlled, and system performance is improved.

The method for controlling access to a core networks according to the embodiments of the present invention have been detailed with reference to FIG. 1 to FIG. 12. A network device and a user equipment according to the embodiments of the present invention are hereinafter detailed with reference to FIG. 13A to FIG. 19B.

Figure 13A:
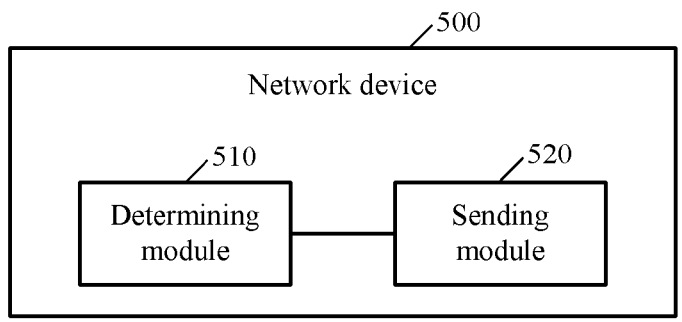
FIGS. 13A and 13B are a schematic block diagram of a network device according to an embodiment of the present invention.

FIG. 13A shows a schematic block diagram of a network device 500 according to an embodiment of the present invention. As shown in FIG. 13A, the network device 500 may include a determining module 510 and a sending module 520.

The determining module 510 is configured to determine that a change occurs in access control information for controlling a user equipment to access a core network.

The sending module 520 is configured to send radio resource control RRC signaling to the user equipment through a dedicated control channel DCCH, where the RRC signaling is used to notify the user equipment that a change occurs in the access control information, so that the user equipment updates the access control information.

Therefore, with the network device in the embodiment of the present invention, when the network device determines that a change occurs in access control information, the user equipment is notified through a dedicated control channel. Therefore, the user equipment can update the access control information in time, and further the user equipment can properly determine whether to access the core network. Therefore, a load of a core network node can be effectively controlled, and system performance is improved.

It should be understood that the network device 500 is a serving radio access network node, where the serving radio access network node includes a radio network controller RNC, a base station, or a base station controller BSC, but the present invention is not limited thereto.

Figure 13B:
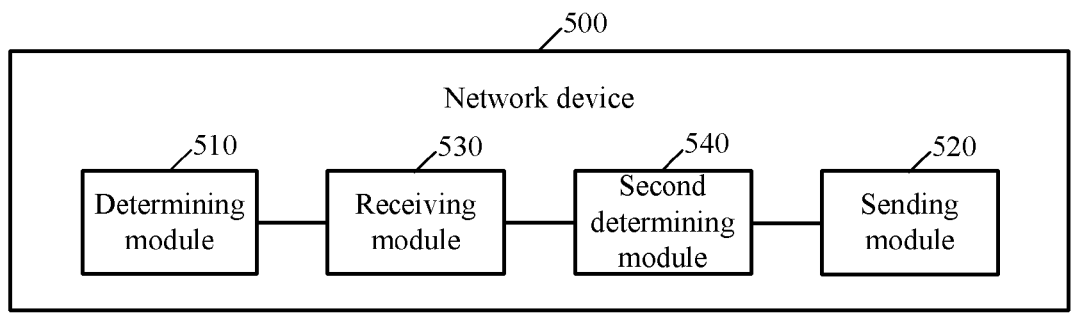

In the embodiment of the present invention, as shown in FIG. 13B, optionally, the network device 500 includes a first determining module 510, a receiving module 530, a second determining module 540, and a sending module 520.

The receiving module 530 is configured to receive, after the first determining module 510 determines that a change occurs in the access control information for controlling the user equipment to access the core network, an initial direct transfer message sent by the user equipment.

The second determining module 540 is configured to determine that all core network nodes that can be accessed by the user equipment are in a barred state.

The sending module 520 is further configured to send, after the second determining module 540 determines that all core network nodes that can be accessed by the user equipment are in the barred state, the RRC signaling to the user equipment through the DCCH.

In the embodiment of the present invention, optionally, the first determining module 510 is further configured to determine, according to at least one of conditions that a change occurs in a serving radio access network node of the user equipment, a change occurs in a serving cell of the user equipment, a change occurs in a core network node to which the serving radio access network node of the user equipment is connected, a change occurs in access control information of the core network node to which the serving radio access network node of the user equipment is connected, and a change occurs in a radio resource load of the serving cell of the user equipment, that a change occurs in the access control information for controlling the user equipment to access the core network.

Optionally, the access control information includes at least one type of information in DSAC information, paging permission access control PPAC information, and registration access control information.

In the embodiment of the present invention, optionally, the RRC signaling sent by the sending module 520 includes a universal mobile telecommunication system terrestrial radio access network (UTRAN) mobility information message, a radio resource control reconfiguration message, a paging type 2 message, a signaling connection release message, or a packet domain assignment reject message. The radio resource control reconfiguration message may be, for example, a radio bearer (Radio Bearer) reconfiguration message, a transmission channel reconfiguration message, or a physical channel reconfiguration message.

Figure 14A:
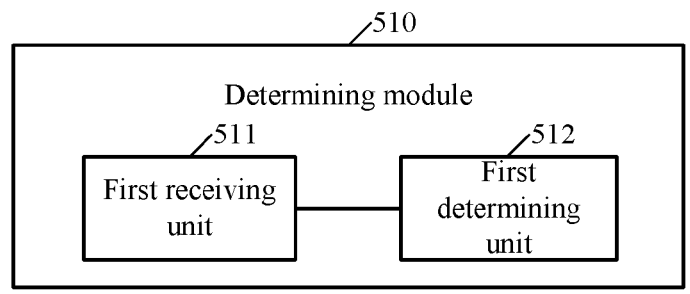
FIGS. 14A to 14C are a schematic block diagram of a determining module according to an embodiment of the present invention.

Optionally, as shown in FIG. 14A, the first determining module 510 includes a first receiving unit 511 and a first determining unit 512, so as to determine that a change occurs in the core network node to which the serving radio access network node of the user equipment is connected, and further determine that a change occurs in the access control information.

The first receiving unit 511 is configured to receive a first relocation request message sent by a first serving radio access network node of the user equipment or a core network node to which the first serving radio access network node is connected, where the first relocation request message includes a global core network identity of the core network node to which the first serving radio access network node is connected.

The first determining unit 512 is configured to determine, according to a fact that the global core network identity of the core network node to which the first serving radio access network node is connected is different from a global core network identity of a core network node to which a second serving radio access network node of the user equipment is connected, that a change occurs in the access control information for controlling the user equipment to access the core network.

In the embodiment of the present invention, the first serving radio access network node refers to a radio access network node or a source radio access network node that provides services for the UE before a cell change in a cell change process of the user equipment; and the second serving radio access network node refers to a radio access network node or a target radio access network node that provides services for the UE after the cell change in the cell change process of the user equipment.

Optionally, the serving radio access network node includes a radio network controller RNC, a base station, or a base station controller BSC; and the core network node to which the serving radio access network node of the user equipment is connected includes a serving GPRS support node SGSN, a mobility management entity MME, or a mobile switching center MSC.

Figure 14B:
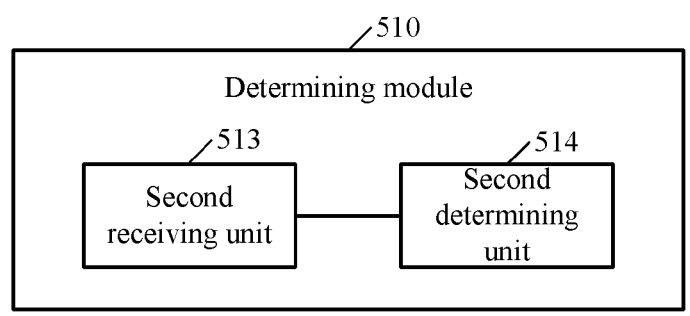

Optionally, as shown in FIG. 14B, the first determining module 510 includes a second receiving unit 513 and a second determining unit 514.

The second receiving unit 513 is configured to receive a second relocation request message sent by a first serving radio access network node of the user equipment or a core network node to which the first serving radio access network node is connected, where the second relocation request message includes access control information of the core network node to which the first serving radio access network node is connected.

The second determining unit 514 is configured to determine, according to a fact that the access control information of the core network node to which the first serving radio access network node is connected is different from access control information of a core network node to which a second serving radio access network node of the user equipment is connected, that a change occurs in the access control information for controlling the user equipment to access the core network.

Figure 14C:
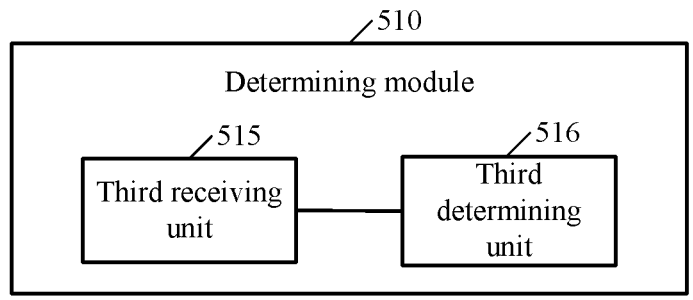

Optionally, as shown in FIG. 14C, the first determining module 510 includes a third receiving unit 515 and a third determining unit 516.

The third receiving unit 515 is configured to receive a notification message sent by a network operation and management center node, where the notification message includes access control information of the core network node to which the serving radio access network node of the user equipment is connected.

The third determining unit 516 is configured to determine, according to the notification message, that a change occurs in the access control information for controlling the user equipment to access the core network.

It should be understood that although how the first determining module 510 determines that a change occurs in the access control information is detailed with reference to FIG. 14A to FIG. 14C, the present invention is not limited thereto. The first determining module 510 may also determine, according to other information or parameters, that a change occurs in the access control information for controlling the user equipment to access the core network. For example, the first determining module 510 may determine, according to a load change condition of the core network node, a change condition of the serving cell of the user equipment, and the like, that a change occurs in the access control information. For another example, the first determining module 510 may also determine that a target RNC is connected to an SGSN and/or an MSC different from an SGSN and/or an MSC to which a source RNC is connected in a handover process, and therefore determine that a change occurs in the access control information; or the first determining module 510 may also determine that an inter-MSC/SGSN handover occurs in a handover process, and therefore determine that a change may occur in the access control information.

In the embodiment of the present invention, the sending module 520 may send RRC signaling to the user equipment through a dedicated control channel DCCH, where the RRC signaling may include changed access control information, so as to notify the user equipment that a change occurs in the access control information. After receiving the RRC signaling, the user equipment may replace the access control information. The RRC signaling may also carry other information, and only indicate that a change occurs in the access control information. In this case, after receiving the RRC signaling, the user equipment may clear the currently stored access control information, so that the user equipment can properly determine whether to access the core network. Therefore, the load of the core network node can be effectively controlled, and system performance is improved.

Figure 15:
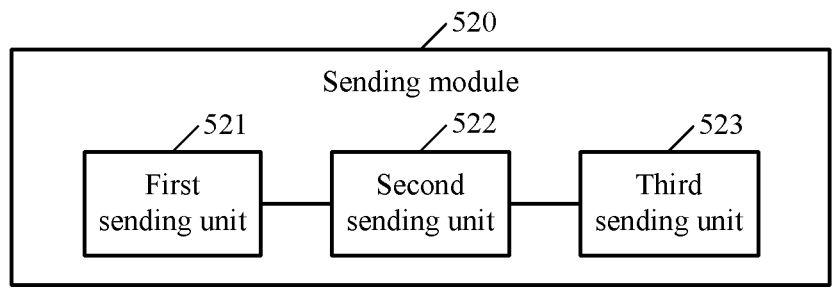
FIG. 15 is a schematic block diagram of a sending module according to an embodiment of the present invention.

Optionally, as shown in FIG. 15, the sending module 520 includes a first sending unit 521.

The first sending unit 521 is configured to send the RRC signaling to the user equipment through the DCCH, where the RRC signaling includes updated access control information for the user equipment or used as an instruction for instructing the user equipment to clear the access control information.

In the embodiment of the present invention, optionally, the first sending unit 521 is configured to:

send the RRC signaling to the user equipment through the DCCH, where all optional information elements in the RRC signaling are configured as null, and the RRC signaling is used to indicate the updated access control information to the user equipment or used as the instruction for instructing the user equipment to clear the access control information; or send the RRC signaling to the user equipment through the DCCH, where an information element in the RRC signaling is configured as a pre-configured value, and the RRC signaling is used to indicate the updated access control information to the user equipment or used as the instruction for instructing the user equipment to clear the access control information.

In the embodiment of the present invention, optionally, the first sending unit is configured to:

send the RRC signaling to the user equipment through the DCCH, where all optional information elements in the RRC signaling are configured as null, and the RRC signaling is used to instruct the user equipment to update the stored access control information from "access forbidden"/"access not forbidden" to "access not forbidden; or is used to instruct the user equipment to update the stored access control information from "access forbidden"/"access not forbidden" to "access forbidden".

In the embodiment of the present invention, optionally, the first sending unit is configured to:

send the RRC signaling to the user equipment through the DCCH, where an information element in the RRC signaling is configured as a pre-configured value, and when the pre-configured value is a first value, the RRC signaling is used to instruct the user equipment to update the stored access control information from "access forbidden"/"access not forbidden" to "access not forbidden"; or when the pre-configured value is a second value, the RRC signaling is used to instruct the user equipment to update the stored access control information from "access forbidden"/ "access not forbidden" to "access forbidden"; or when the pre-configured value is a third value, the RRC signaling is an instruction for instructing the user equipment to clear the access control information.

Optionally, as shown in FIG. 15, the sending module 520 includes a second sending unit 522 and/or a third sending unit 523.

The second sending unit 522 is configured to send a first paging type 2 message to the user equipment, where the first paging type 2 message indicates that a change occurs in a system broadcast message.

The third sending unit 523 is configured to send a second paging type 2 message to the user equipment, where the second paging type 2 message includes value tag information of a system information block type 3 (SIB3), and the value tag information of the SIB3 is different from value tag information of a SIB3 stored in the user equipment.

It should be understood that in the embodiment of the present invention, the network device may also determine that a change occurs in mobility information of the user equipment, and send radio resource control RRC signaling to the user equipment through a dedicated control channel DCCH, where the RRC signaling is used to notify the user equipment that a change occurs in access control information for accessing a core network domain, so that the user equipment updates the access control information.

Optionally, determining that a change occurs in mobility information of the user equipment includes: determining that a change occurs in the access control information for controlling the user equipment to access the core network; or determining that one of the following parameters of the user equipment needs to be updated: integrity protection related information of the user equipment, encryption mode information of the user equipment, identity information of the user equipment, a timer and a variable used by the user equipment in the connected state, dedicated priority information of the user equipment, identity information of a UTRAN registration area (URA) to which the user equipment belongs, radio bearer (Radio Bearer) parameter information of the user equipment, and the like.

Optionally, the RRC signaling includes the updated access control information for the user equipment or an instruction for instructing the user equipment to clear the access control information; and the RRC signaling includes a universal mobile telecommunication system terrestrial radio access network (UTRAN) mobility information message, a radio resource control reconfiguration message, a paging type 2 message, a signaling connection release message, or a packet domain assignment reject message. For brevity, details are not repeated herein.

It should be understood that the network device 500 according to the embodiment of the present invention may correspond to the serving radio access network node in the embodiment of the present invention, and that the foregoing and other operations and/or functions of the modules in the network device 500 are respectively used to implement the corresponding procedures of the methods in FIG. 1 to FIG. 5. For brevity, details are not repeated herein.

Therefore, with the network device in the embodiment of the present invention, when the network device determines that a change occurs in access control information, the user equipment is notified through a dedicated control channel. Therefore, the user equipment can update the access control information in time, and further the user equipment can properly determine whether to access the core network. Therefore, the load of the core network node can be effectively controlled, and system performance is improved.

Figure 16:
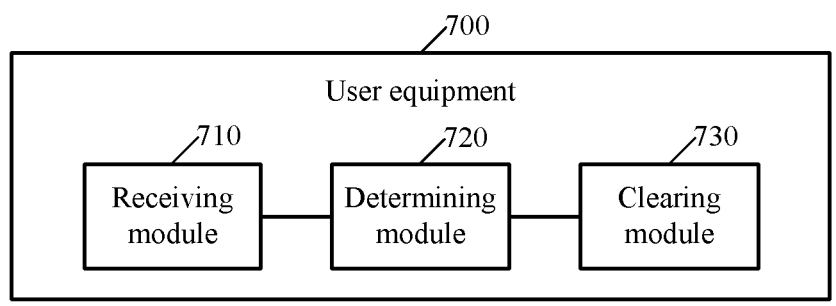
FIG. 16 is a schematic block diagram of a user equipment according to an embodiment of the present invention.

FIG. 16 shows a schematic block diagram of a user equipment 700 according to an embodiment of the present invention. As shown in FIG. 16, the user equipment 700 includes a receiving module 710, a determining module 720, and a clearing module 730.

The receiving module 710 is configured to receive, from a system broadcast message of a cell, and store access control information for controlling the user equipment to access a core network.

The determining module 720 is configured to determine that a change occurs in the access control information.

The clearing module 730 is configured to clear the stored access control information.

Therefore, with the user equipment in the embodiment of the present invention, the user equipment determines that a change occurs in access control information, and updates the access control information in time, so that the user equipment can properly determine whether to access the core network. Therefore, a load of a core network node can be effectively controlled, and system performance is improved.

In the embodiment of the present invention, the determining module 720 may determine, according to an indication received from a serving radio access network node, that a change occurs in the access control information; and may also determine, according to other parameters or information, that a change occurs in the access control information, without requiring any indication from the serving radio access network node. Separate descriptions are given hereinafter.

Optionally, the determining module 720 is further configured to determine, according to radio resource control RRC signaling sent by the serving radio access network node of the user equipment through a dedicated control channel DCCH, that a change occurs in the access control information, where the RRC signaling is used to notify the user equipment that a change occurs in the access control information.

Figure 17:
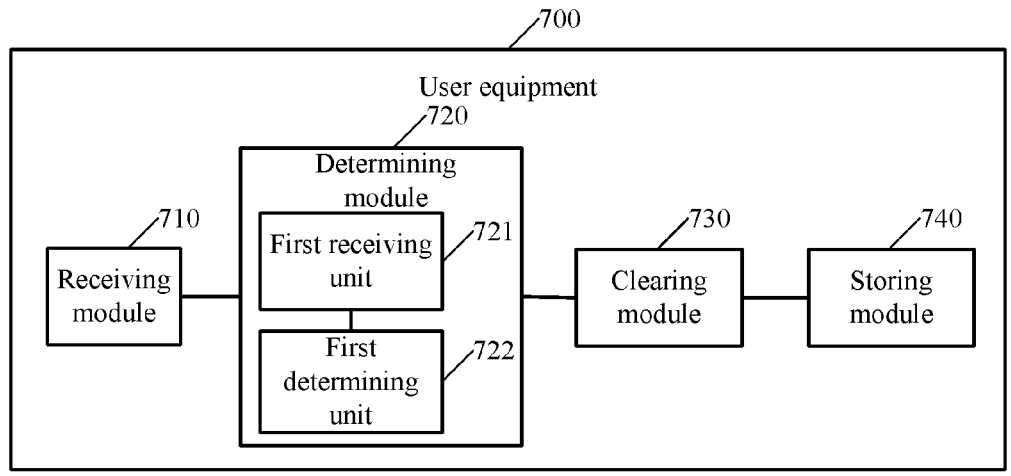
FIG. 17 is another schematic block diagram of a user equipment according to an embodiment of the present invention.

In the embodiment of the present invention, optionally, as shown in FIG. 17, the user equipment 700 includes the receiving module 710, the determining module 720, the clearing module 730, and a storing module 740, where the determining module 720 includes a first receiving unit 721 and a first determining unit 722.

The first receiving unit 721 is configured to receive the RRC signaling sent by the serving radio access network node through the DCCH, where the RRC signaling includes updated access control information for the user equipment.

The first determining unit 722 is configured to determine, according to the RRC signaling, that a change occurs in the access control information.

The storing module 740 is configured to store, after the stored access control information is cleared, the access control information included in the RRC signaling.

In the embodiment of the present invention, optionally, the determining module 720 is configured to:

determine, according to the radio resource control (RRC) signaling sent by the serving radio access network node of the user equipment through the dedicated control channel (DCCH), that a change occurs in the access control information, where all optional information elements in the RRC signaling are configured as null, and the RRC signaling is used to indicate updated access control information to the user equipment or used as an instruction for instructing the user equipment to clear the access control information; or an information element in the RRC signaling is configured as a pre-configured value, and the RRC signaling is used to indicate the updated access control information to the user equipment or used as the instruction for instructing the user equipment to clear the access control information.

In the embodiment of the present invention, optionally, the clearing module 730 is configured to:

update, when all optional information elements in the RRC signaling are configured as null, the access control information stored in the user equipment from "access forbidden"/"access not forbidden" to "access not forbidden"; or update, when all optional information elements in the RRC signaling are configured as null, the access control information stored in the user equipment from "access forbidden"/"access not forbidden" to "access forbidden".

In the embodiment of the present invention, optionally, the clearing module is configured to:

update, when the pre-configured value is a first value, the access control information stored in the user equipment from "access forbidden"/"access not forbidden" to "access not forbidden"; or update, when the pre-configured value is a second value, the access control information stored in the user equipment from "access forbidden"/"access not forbidden" to "access forbidden"; or clear, when the pre-configured value is a third value, the access control information stored in the user equipment.

In the embodiment of the present invention, optionally, the access control information includes at least one type of information in DSAC information, paging permission access control PPAC information, and registration access control information.

Optionally, the RRC signaling includes a universal mobile telecommunication system terrestrial radio access network (UTRAN) mobility information message, a radio resource control reconfiguration message, a paging type 2 message, a signaling connection release message, or a packet domain assignment reject message. The radio resource control reconfiguration message may be, for example, a radio bearer (Radio Bearer) reconfiguration message, a transmission channel reconfiguration message, or a physical channel reconfiguration message.

In the embodiment of the present invention, the first serving radio access network node refers to a radio access network node or a source radio access network node that provides services for the UE before a cell change in a cell change process of the user equipment; and the second serving radio access network node refers to a radio access network node or a target radio access network node that provides services for the UE after the cell change in the cell change process of the user equipment.

Optionally, the serving radio access network node includes a radio network controller RNC, a base station, or a base station controller BSC; and the core network node includes a serving GPRS support node SGSN, a mobility management entity MME, or a mobile switching center MSC.

Figure 18A:
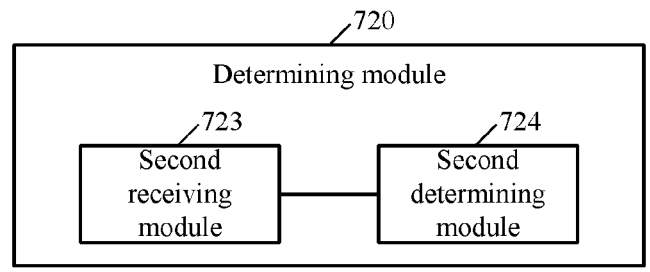
FIGS. 18A to 18C are a schematic block diagram of a determining module according to an embodiment of the present invention.

In the embodiment of the present invention, the RRC signaling may also only indicate that a change occurs in the access control information. As shown in FIG. 18A, the determining module 720 according to the embodiment of the present invention includes a second receiving module 723 and a second determining module 724.

The second receiving module 723 is configured to receive a first paging type 2 message sent by the serving radio access network node through the DCCH, where the first paging type 2 message indicates that a change occurs in a system broadcast message.

The second determining module 724 is configured to determine, according to the first paging type 2 message, that a change occurs in the access control information.

Figure 18B:
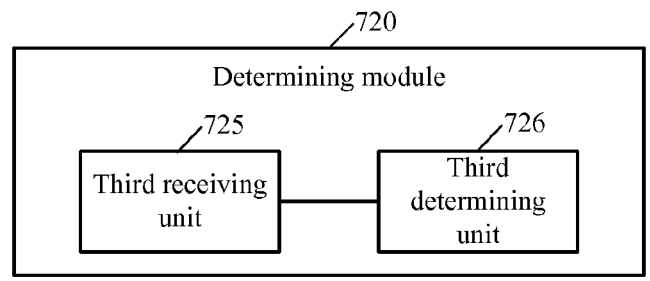

Optionally, as shown in FIG. 18B, the determining module 720 includes a third receiving unit 725 and a third determining unit 726.

The third receiving unit 725 is configured to receive a second paging type 2 message sent by the serving radio access network node through the DCCH, where the second paging type 2 message includes value tag information of a system information block type 3 (SIB3).

The third determining unit 726 is configured to determine, according to a fact that the value tag information of the SIB3 included in the second paging type 2 message is different from value tag information of a SIB3 stored in the user equipment, that a change occurs in the access control information.

In the embodiment of the present invention, the user equipment may also determine, according to parameters or information of the serving radio access network node, the core network node, and the like, that a change occurs in the access control information, without requiring the serving radio access network node to use any indication to notify that a change occurs in the access control information to the user equipment.

Figure 18C:
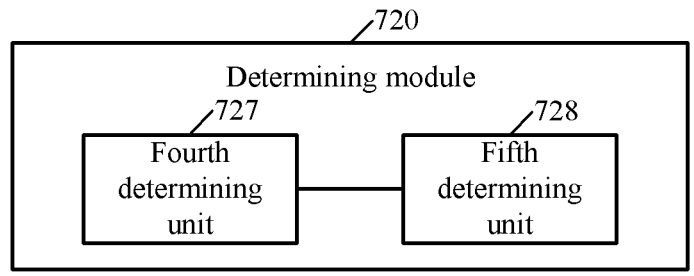

Optionally, as shown in FIG. 18C, the determining module 720 includes a fourth determining unit 727 and a fifth determining unit 728.

The fourth determining unit 727 is configured to determine that a change occurs in the serving radio access network node of the user equipment, or a change occurs in the core network node to which the serving radio access network node of the user equipment is connected.

The fifth determining unit 728 is configured to determine, according to that a change occurs in the serving radio access network node or a change occurs in the core network node, that a change occurs in the access control information.

Figure 19A:
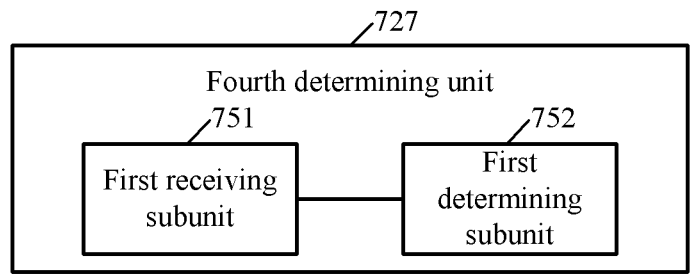
FIGS. 19A and 19B are a schematic block diagram of a fourth determining module according to an embodiment of the present invention.

In the embodiment of the present invention, as shown in FIG. 19A, optionally, the fourth determining unit 727 includes a first receiving subunit 751 and a first determining subunit 752.

The first receiving subunit 751 is configured to receive an RRC reconfiguration message sent by the serving radio access network node of the user equipment, where the RRC reconfiguration message includes a second universal mobile telecommunication system terrestrial radio access network radio network temporary identifier U-RNTI.

The first determining subunit 752 is configured to determine, according to a fact that a serving radio network controller identity (SRNC ID) in the second U-RNTI is different from an SRNC ID in a first U-RNTI stored in the user equipment, that a change occurs in the serving radio access network node of the user equipment.

Figure 19B:
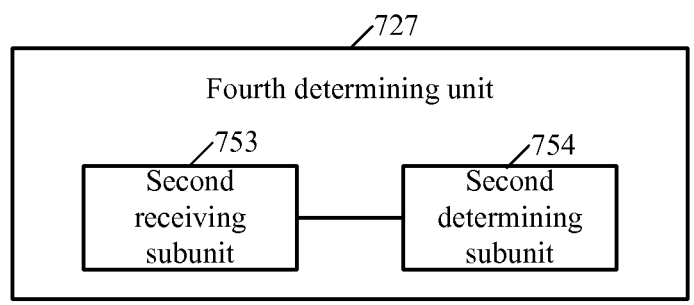

As shown in FIG. 19B, optionally, the fourth determining unit 727 includes a second receiving subunit 753 and a second determining subunit 754.

The second receiving subunit 753 is configured to receive a second temporary mobile subscriber identity TMSI or a second packet temporary mobile subscriber identity P-TMSI sent by the core network node to which the serving radio access network node of the user equipment is connected.

The second determining subunit 754 is configured to determine, according to a fact that a network resource identifier NRI in the second TMSI or the second P-TMSI is different from an NRI in a first TMSI or a first P-TMSI stored in the user equipment, that a change occurs in the core network node to which the serving radio access network node of the user equipment is connected.

The user equipment 700 according to the embodiment of the present invention may correspond to the user equipment in the embodiment of the present invention, and the foregoing and other operations and/or functions of the modules in the user equipment 700 are respectively used to implement the corresponding procedures of the methods in FIG. 6 to FIG. 12. For brevity, details are not repeated herein.

It should also be understood that interactions between the user equipment and the network device and related features and functions that are described on the user equipment side correspond to those described on the base station side. For brevity, details are not repeated herein.

Therefore, with the user equipment provided in the embodiment of the present invention, the user equipment determines that a change occurs in access control information, and updates the access control information in time, so that the user equipment can properly determine whether to access the core network. Therefore, the load of the core network node can be effectively controlled, and system performance is improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for a purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling access to a core network, comprising:
    determining that a change occurs in access control information of a core network node for controlling a user equipment to access a core network; and
    sending radio resource control (RRC) signaling to the user equipment through a dedicated control channel (DCCH), wherein the RRC signaling is used to notify the user equipment that the change occurs in the access control information of the core network node, so that the user equipment updates the access control information.

2. The method according to claim 1, wherein the determining that the change occurs in the access control information for controlling the user equipment to access the core network comprises:
    determining, according to at least one of conditions that a change occurs in the core network node to which a serving radio access network node of the user equipment is connected, a change occurs in the access control information of the core network node to which a serving radio access network node of the user equipment is connected, and a change occurs in a radio resource load of a serving cell of the user equipment, that the change occurs in the access control information of the core network node for controlling the user equipment to access the core network.

3. The method according to claim 2, wherein the serving radio access network node comprises a radio network controller (RNC), a base station, or a base station controller (BSC), and the core network node comprises a serving GPRS support node (SGSN), a mobility management entity (MME), or a mobile switching center (MSC).

4. The method according to claim 1, wherein the sending radio resource control (RRC) signaling to the user equipment through the dedicated control channel (DCCH) comprises:
    sending the RRC signaling to the user equipment through the DCCH, wherein the RRC signaling is used to indicate updated access control information to the user equipment or comprises an instruction for instructing the user equipment to clear the access control information.

5. The method according to claim 1, wherein the access control information comprises at least one type of information in core network domain access control (DSAC) information, paging permission access control (PPAC) information, and registration access control information.

6. The method according to claim 1, wherein the RRC signaling comprises a universal mobile telecommunication system terrestrial radio access network (UTRAN) mobility information message, a radio resource control reconfiguration message, a paging type 2 message, a signaling connection release message, or a packet domain assignment reject message.

7. A method for controlling access to a core network, comprising:
    receiving and storing access control information for controlling a user equipment to access a core network from a system broadcast message of a cell;
    determining that a change occurs in the access control information; and
    clearing the stored access control information.

8. The method according to claim 7, wherein the determining that the change occurs in the access control information comprises:
    determining, according to radio resource control (RRC) signaling sent by a serving radio access network node of the user equipment through a dedicated control channel (DCCH), that a change occurs in the access control information, wherein the RRC signaling is used to notify the user equipment that a change occurs in the access control information.

9. The method according to claim 8, wherein the RRC signaling comprises a universal mobile telecommunication system terrestrial radio access network (UTRAN) mobility information message, a radio resource control reconfiguration message, a paging type 2 message, a signaling connection release message, or a packet domain assignment reject message.

10. The method according to claim 7, wherein: the determining that the change occurs in the access control information comprises:
   receiving the RRC signaling sent by the serving radio access network node through the DCCH, wherein the RRC signaling comprises updated access control information for the user equipment; and
   determining, according to the RRC signaling, that a change occurs in the access control information;
   after the clearing the stored access control information, the method further comprises:
   storing the access control information comprised in the RRC signaling.

11. The method according to claim 7, wherein the determining that the change occurs in the access control information comprises:
   determining that a change occurs in a serving radio access network node of the user equipment, or a change occurs in a core network node to which the serving radio access network node of the user equipment is connected; and
   determining, according to that a change occurs in the serving radio access network node or a change occurs in the core network node, that a change occurs in the access control information.

12. The method according to claim 11, wherein the determining that the change occurs in the serving radio access network node of the user equipment comprises:
   receiving an RRC reconfiguration message sent by the serving radio access network node of the user equipment, wherein the RRC reconfiguration message comprises a second universal mobile telecommunication system terrestrial radio access network radio network temporary identifier (U-RNTI); and
   determining, according to a fact that a serving radio network controller identity (SRNC ID) in the second U-RNTI is different from an SRNC ID in a first U-RNTI stored in the user equipment, that a change occurs in the serving radio access network node of the user equipment.

13. The method according to claim 11, wherein the serving radio access network node comprises a radio network controller (RNC), a base station, or a base station controller (BSC), and the core network node comprises a serving GPRS support node (SGSN), a mobility management entity (MME), or a mobile switching center (MSC).

14. The method according to claim 7, wherein the access control information comprises at least one type of information in domain specific access control (DSAC) information, paging permission access control (PPAC) information, and registration access control information.

15. A network device, comprising:
   a processor, configured to determine that a change occurs in access control information of a core network node for controlling a user equipment to access a core network; and
   a transmitter, configured to send radio resource control (RRC) signaling to the user equipment through a dedicated control channel (DCCH), wherein the RRC signaling is used to notify the user equipment that the change occurs in the access control information of the core network node, so that the user equipment updates the access control information.

16. The network device according to claim 15, wherein the processor is further configured to determine, according to at least one of conditions that a change occurs in the core network node to which a serving radio access network node of the user equipment is connected, a change occurs in the access control information of the core network node to which a serving radio access network node of the user equipment is connected, and a change occurs in a radio resource load of the serving cell of the user equipment, that the change occurs in the access control information of the core network node for controlling the user equipment to access the core network.

17. The network device according to claim 16, wherein the serving radio access network node comprises a radio network controller (RNC), a base station, or a base station controller (BSC), and the core network node comprises a serving GPRS support node (SGSN), a mobility management entity (MME), or a mobile switching center (MSC).

18. The network device according to claim 15, wherein the transmitter is further configured to send the RRC signaling to the user equipment through the DCCH, wherein the RRC signaling comprises updated access control information for the user equipment or an instruction for instructing the user equipment to clear the access control information.

19. The network device according to claim 15, wherein the access control information comprises at least one type of information in domain specific access control (DSAC) information, paging permission access control (PPAC) information, and registration access control information.

20. The network device according to claim 15, wherein the RRC signaling comprises a universal mobile telecommunication system terrestrial radio access network (UTRAN) mobility information message, a radio resource control reconfiguration message, a paging type 2 message, a signaling connection release message, or a packet domain assignment reject message.

21. A user equipment, comprising:
   a receiver, configured to receive, from a system broadcast message of a cell; and
   a processor, configured to store access control information for controlling the user equipment to access a core network and determine that a change occurs in the access control information and clear the stored access control information.

22. The user equipment according to claim 21, wherein the processor is further configured to determine, according to radio resource control (RRC) signaling sent by a serving radio access network node of the user equipment through a dedicated control channel (DCCH), that a change occurs in the access control information, wherein the RRC signaling is used to notify the user equipment that a change occurs in the access control information.

23. The user equipment according to claim 22, wherein the RRC signaling comprises a universal mobile telecommunication system terrestrial radio access network (UTRAN) mobility information message, a radio resource control reconfiguration message, a paging type 2 message, a signaling connection release message, or a packet domain assignment reject message.

24. The user equipment according to claim 21, wherein the receiver is further configured to receive the RRC signaling sent by the serving radio access network node through the DCCH, wherein the RRC signaling comprises updated access control information for the user equipment; and the processor is further configured to determine, according to the RRC signaling, that a change occurs in the access control information and store, after the stored access control information is cleared, the access control information comprised in the RRC signaling.

25. The user equipment according to claim 21, wherein the processor is further configured to determine that a change occurs in a serving radio access network node of the user equipment, or a change occurs in a core network node to which the serving radio access network node of the user equipment is connected; and configured to determine, according to that a change occurs in the serving radio access network node or a change occurs in the core network node, that a change occurs in the access control information.

26. The user equipment according to claim 25, wherein the receiver is further configured to receive an RRC reconfiguration message sent by the serving radio access network node of the user equipment, wherein the RRC reconfiguration message comprises a second universal mobile telecommunication system terrestrial radio access network radio network temporary identifier (U-RNTI); and the processor is further configured to determine, according to a fact that a serving radio network controller identity (SRNC ID) in the second U-RNTI is different from an SRNC ID in a first U-RNTI stored in the user equipment, that a change occurs in the serving radio access network node of the user equipment.

27. The user equipment according to claim 25, wherein the serving radio access network node comprises a radio network controller (RNC), a base station, or a base station controller (BSC), and the core network node comprises a serving GPRS support node (SGSN), a mobility management entity (MME), or a mobile switching center (MSC).

28. The user equipment according to claim 21, wherein the access control information comprises at least one type of information in domain specific access control (DSAC) information, paging permission access control (PPAC) information, and registration access control information.

* * * * *